United States Patent [19]
Nakagawa et al.

[11] Patent Number: 4,961,191
[45] Date of Patent: Oct. 2, 1990

[54] TEST CIRCUIT FOR LOGIC CIRCUITS

[75] Inventors: Shin-ichi Nakagawa; Hideyuki Terane, both of Itami, Japan

[73] Assignee: Mitsubishi Denki Kabushiki Kaisha, Tokyo, Japan

[21] Appl. No.: 269,507

[22] Filed: Nov. 10, 1988

[30] Foreign Application Priority Data

Sep. 2, 1988 [JP] Japan ................................ 63-221166

[51] Int. Cl.$^5$ .............................................. G06F 11/00
[52] U.S. Cl. .................................... 371/22.1; 371/15.1
[58] Field of Search ...................... 371/22.1, 22.2, 22.3, 371/22.4, 22.5, 22.6, 15.1, 16.1, 18; 324/73 R, 73 AT; 364/200 MS, 900 MS

[56] References Cited

U.S. PATENT DOCUMENTS

| 4,357,703 | 11/1982 | Vanbrunt | 371/22.5 |
| 4,507,727 | 3/1985 | Magar | 364/200 |
| 4,710,927 | 12/1987 | Miller | 371/22.1 |
| 4,831,623 | 5/1989 | Terzian | 371/22.1 |
| 4,837,765 | 6/1989 | Suzuki | 371/22.1 |

FOREIGN PATENT DOCUMENTS 189047 9/1985 Japan .

Primary Examiner—Jerry Smith
Assistant Examiner—Robert W. Beausoliel
Attorney, Agent, or Firm—Townsend and Townsend

[57] ABSTRACT

A test circuit for logic circuits of the present invention is constructed with a register for storing data to be operated in the logic circuits and its operation results and interface circuit is connected to the register through an internal bus and is controlled from external terminals. The data to be operated on by the logic circuits is set in the register directly from the interface circuit for operation, and the operation result data stored in the register are outputted to the external source directly from the interface circuit. By adopting such a configuration, since the data to be operated in the logic circuits can be transferred from the interface circuit to the register, and data of the operation result stored in the register can be transferred to the interface circuit without executing a data transfer instruction, the logic circuits can be tested readily by giving the data to the logic circuits from the external and outputting its operation results to the external.

2 Claims, 2 Drawing Sheets

TEST CIRCUIT FOR LOGIC CIRCUITS

BACKGROUND OF THE INVENTION

1. Field of the Invention

The present invention relates to a test circuit for logic circuits which fetches data from a register connected to an interface circuit. The semiconductor circuit performs logical operations and stores results in the register.

2. Description of the Prior Art

FIG. 1 is a block diagram showing a conventional semiconductor circuits such as, a one-chip microcomputer. The semiconductor circuit includes logic circuits for receiving data from a register connected to an interface circuit. An operation is performed, the result of which is stored in the register.

In the figure, numeral 1 denotes an input terminal. An instruction code 101 is input on input terminal 1 by control of a CPU, (not shown).

An instruction decoder 2 decodes the instruction code 101 input from the input terminal 1. A decoded result of instruction decoder 2 is input to a register control circuit 3 and interface control circuit 4 as a control signal 102.

The register control circuit 3 outputs a control signal 103 for controlling data transmissions between a register 5 and an internal bus 8. These data transmitted are controlled according to the control signal 102 received from the instruction decoder 2.

The interface control circuit 4 outputs a control signal 104 which controls an interface circuit 6. Control of interface circuit 6 is determined according to the control signal 102 received from the instruction decoder 2.

The register 5 is connected to the internal bus 8 and controlled by the control signal 103 received from the register control circuit 3. The data stored in register 5 is output to the internal bus 8. Further, data on internal bus 8 can be stored in register 5. Register 5 is connected to an internal logic circuit 20 as such as an ALU.

The internal logic circuit 20 fetches data stored in the register 5. A prescribed logical operation is performed on the data and the result is again stored in the register 5.

The interface circuit 6 is connected to the internal bus 8 and controlled by the control signal 104 received from the interface control circuit 4. Depending upon the state of control signal 104, data is either input from an external terminal 7 to the internal bus 8, or output from the interface circuit 6 to the external terminal 7.

Operations of a semiconductor circuit including such conventional logic circuits are as follows.

When the instruction code 101 is input to the input terminal 1, the instruction code is decoded by the instruction decoder 2 from which the control signal 102 is output.

Now, suppose that the instruction code 101 is a data transfer instruction code. In that case the instruction code stores data in the register 5 from the external terminal 7 of the interface circuit 6 via the internal bus 8. Alternatively, register 5 may output the data to the external terminal 7 via the internal bus 8 and interface circuit 6.

The control signal 102 is input to the register control circuit 3 and interface control circuit 4. The register control circuit 3 outputs the control signal 103 in response to receiving the control signal 102 to the register 5. The interface control circuit 4 outputs the control signal 104 responsive to the control signal 102 to the interface circuit 6.

The instruction code 101 input to the input terminal 1 may be an instruction for outputting data to the external terminal 7 from the register 5. In that case, register 5 outputs the data to the internal bus 8 according to the control signal 103 input from the register control circuit 3. The interface circuit 6 fetches the data from the internal bus 8 and outputs to the external terminal 7 according to the control signal 104 received from the interface control circuit 4. Likewise, the instruction code input to the input terminal 1 may be an instruction for setting data to the register 5 from the external terminal 7. In this case, the interface circuit 6 fetches the data from the external terminal 7 and outputs it to the internal bus 8 according to the control signal 104 received from the interface control circuit 4. The register 5 fetches and stores the data from the internal bus 8 according to the control signal 103 received from the register control circuit 3. The data stored in the register 5 is input to the internal logic circuit 20.

The conventional semiconductor circuit including the logic circuit has the configuration described hereinabove. It may used for checking, for example, the operation of internal logic circuit 20 or for determining whether the operating function is normal. To perform checking it is necessary to execute a prescribed program in the CPU, (not shown), to transfer the dat to the internal logic circuit 20 from the external terminal 7 of the interface circuit 6. The result is output to the external terminal 7 of the interface circuit 6 from the internal logic circuit 20.

In other words, the instruction code of data transfer is input to the input terminal 1 at each time to execute the data transfer to the register 5 from the interface circuit 6 and to the interface circuit 6 from the register 5.

In view of above circumstances, inventions disclosed in Japanese Patent Application Laid-Open Nos. 208476 (1984), 168051 (1986) and 132182 (1987) have been proposed.

In Japanes Patent Application Laid-Open No. 208476 (1984), "a test circuit is described for forming a test mode signal. The test circuit receives serial data and supplies a test pattern signal directly to the internal logic circuit from a predetermined input terminal. The circuit also sends out a signal of an internal logic circuit to a predetermined output terminal. The test circuit is incorporated to improve the test effect without increasing the number of external terminals". In the same invention, "the inputted serial data is set at a signal level higher than the ordinary signal level so as" not to increase the level on the external terminals.

Thus, in the invention disclosed in Japanese Patent Application Laid-Open No. 208476 (1984), the test circuit requires various parts such as a level detecting circuit for detecting a level of the serial data to be inputted, a shift register for holding it and a decoder. However, since the test circuit is built in the semiconductor circuit for use in the supplier side, and for users, it consumes just an actual capacity of the semiconductor circuit. Therefore, a test circuit which is too complicated with too many component parts is not preferable.

The invention disclosed in Japanese Patent Application Laid-Open No. 168051 (1986) relates to a test circuit of a RAM of single-chip microcomputer. Therefore, for checking whether the operation result of the logic circuits such as ALU etc. is normal, a specific address of the RAM must be accessed at a suitable timing to take out the data.

The invention of Japanese Patent Application Laid-Open No. 132182 (1986) relates to a test circuit of a large scale integrated circuit, which is divided into a plurality of blocks so as to be tested separately respectively. Thus, it is not suitale for checking whether the operation result of a specific logic circuit is correct.

SUMMARY OF THE INVENTION

The present invention has been designed in view of the aforesaid circumstances. Therefore, it is a primary object thereof to provide a test circuit for logic circuits capable of testing whether various logic circuits included in a semiconductor circuit such as a one-chip microcomputer and the like are functioning properly by a simple operation.

The test circuit for logic circuits according to the present invention is constructed with a register for storing data. The register is operated by the logic circuits and an interface circuit is connected to the register through an internal bus. The register, the logic circuits, and the interface circuit are controlled from external terminals. The data to be operated by the logic circuits is set in the register directly from the interface circuit. The operation result data stored in the register are outputted to the external source directly from the interface circuit. By having such a configuration, the data to be operated by the logic circuits can be transferred from the interface circuit to the register, and the operation result data stored in the register can be transferred to the interface circuit without executing a data transfer instruction. This the test can be performed easily.

The above and further objects and features of the invention will be more fully apparent from the following detailed description with accompanying drawings.

DESCRIPTION OF THE PREFERRED EMBODIMENT

The present invention will be described in detail as follows with reference to the drawings showing its embodiment.

Figure 1:
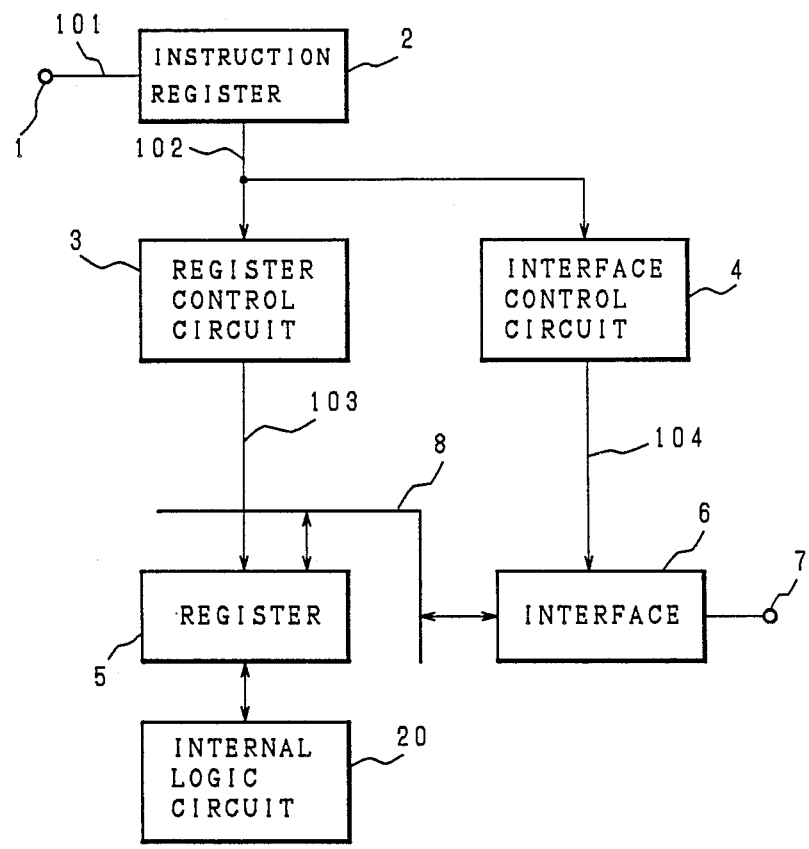
FIG. 1 is a block diagram showing a configuration of a conventional semiconductor circuit including logic circuits.
Figure 2:
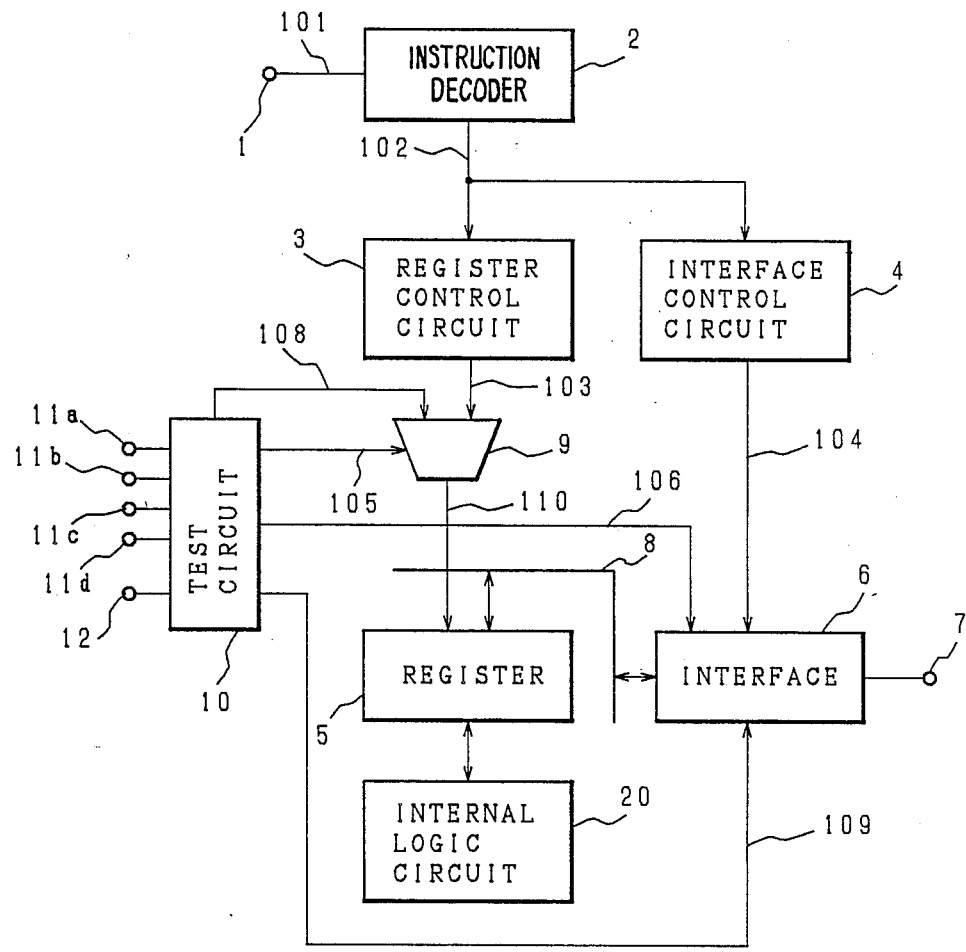
FIG. 2 is a block diagram showing a configuration of a semiconductor circuit including a test circuit for logic circuits according to the present invention.

FIG. 2 is a block diagram showing a configuration of a semiconductor circuit including a test circuit for logic circuits according to the present invention.

In the figure, numeral 1 denotes an input terminal. Instruction code 101 is input on this terminal by control of a CPU (not shown).

An instruction decoder is indicated generally at 2 whereby the instruction code 101 inputted from the input terminal 1 is decoded. A decoded result from the instruction decoder 2 is given to a register control circuit 3 and an interface control circuit 4 as a control signal 102.

The register control circuit 3 outputs a control signal 103 for controlling data transmission between a register 5 and internal bus 8. Control is determined according to the control signal 102 received from the instruction decoder 2. The control signal 103 constitutes one input of a 2-input multiplexer 9 to be described later.

The interface control circuit 4 outputs a control signal 104 for controlling an interface circuit 6 according to the control signal 102 received from the instruction decoder 2.

The register 5 is connected to the internal bus 8 and controlled by the control signal 103 input from the register control circuit 3. Register 5 outputs data stored therein to the internal bus 8 and stores the data input from the internal bus 8. An internal logic circuit 20 of, for example, an ALU to be tested by the test circuit of the present invention is also connected to register 5.

The internal logic circuit 20 fetches the data stored in the register 5 to execute a predetermined logical operation and stores its result again in the register 5.

The interface circuit 6 is connected to the internal bus 8 and is controlled by the control signal 104 input from the interface control circuit 4. Interface circuit 6 outputs the data input from the external terminal 7 to the internal bus 8, and fetches the data from the internal bus 8 to be output to the external terminal 7.

The control signal 103 output from the register control circuit 3 constitutes one input of the 2-input multiplexer 9. A register control signal 108 for test is output from a test circuit 10 and constitutes the other to multiplexer 9. Furthermore, a signal which selects an output signal 110 of the multiplexer 9, either as the control signal 103 or the register control signal 108 for test, is input from the test circuit 10 as a control signal switching signal 105. The output signal 110 of the multiplexer 9, namely, either the control signal 103 or register control signal 108 for test, is input to the register 5.

The test circuit 10 of the present invention includes a first external input terminal 12. A first signal is input on this terminal switching a mode or a whole circuit to either an ordinary operating state or a testing state. Second external inut terminals 11a, 11b, 11c, 11d etc. are connected to receive the control signal (second signal) at testing state for the multiplexer 9 and interface circuit 6. Test includes 4 outputs: circuit 10. First, register control signal 108 for test; second control signal switching signal 105 for the register control circuit 3; third there are an interface circuit control signal 109 for test; and fourth, a control signal switching signal 106 for the interface circuit 6 to be controlled by either the control signal 104 from the interface control circuit 4 or the aforesaid interface circuit control signal 109 for test.

Operations of the semiconductor circuit including such test circuit 10 for logic circuits of the present invention are as follows.

First, when a low level signal is given to the first external input terminal 12 of the test circuit 10, an ordinary operation is performed. That is, when the low level signal is input to the first external input terminal 12, both the control signal switching signal 105 for the register control circuit 3 and the control signal switching signal 106 for the interface circuit 6 are at a low level. Furthermore, the control signal 103 output from the register control circuit 3 is input to the register 5 and the control signal 104 output from the interface control circuit 4 is input to the interface circuit 6.

Thus, in such a case, the operation is similar to the prior art described above.

When the instruction code 101 is input to the input terminal 1, it is decoded by the instruction decoder 2 and the control signal 102 is output from the instruction decoder 2. Supposing that the instruction code 101 is one of either a data transfer instruction code, an instruction code which stores data in the register 5 from the external terminal 7 of the interface circuit 6 through the internal bus 8, or an instruction code which outputs the data to the external terminal 7 from the register 5 through the internal bus 8 and interface circuit 6.

The control signal 102 is input to the register control circuit 3 and interface control circuit 4. The register control circuit 3 outputs the control signal 103 responsive to the control signal 102 to the register 5. The interface control circuit 4 outputs the control signal 104 responsive to the control signal 102 to the interface circuit 6.

When the instruction code 101 input to the input terminal 1 is the instruction for data outputting to the external terminal 7 from the register 5, the register 5 outputs the data to the internal bus 8 according to the control signal 103 given from the register control circuit 3. At the same time, the interface circuit 6 fetches the data from the internal bus 8 and outputs it to the external terminal 7 according to the control signal 104 given from the interface control circuit 4. When the instruction code input to the input terminal 1 is an instruction for setting data to the register 5 from the external terminal 7, the interface circuit 6 fetches the data from the external terminal 7 and outputs it to the internal bus 8 according to the control signal 104 given from the interface control circuit 4. The register 5 fetches the data from the internal bus 8 and stores it therein according to the control signal 103 given from the register control circuit 3. The data stored in the register 5 are given to the internal logic circuit 20.

When a high level signal (the first signal) is given to the first external input terminal 12 of the test circuit 10, a testing state is attained. That is, when a high level signal is input to the first external input terminal 12, both the control signal switching signal 105 for the register control circuit 3 and control signal switching signal 106 for the interface circuit 6 are turned into the high level. The register control signal 108 for test output from the test circuit 10 is input to the register 5, and the interface circuit control signal 109 for test output from the test circuit 10 is given to the interface circuit 6.

When the data (the second signal) signifying the instruction to set data in the register 5 from the external terminal 7 of the interface circuit 6 through the internal bus 8 is input to the second external input terminals 11a, 11b, 11c, 11d of the test circuit 10, the test circuit 10 outputs the register control signal 108 for test. At the same time, test circuit 10 outputs interface circuit control signal 109 for test according to the data input to the second external input terminals 11a, 11b, 11c and 11d.

The interface circuit 6 fetches the data from the external terminal 7 and outputs it to the internal bus 8 according to the interface circuit control signal 109 for test given from the test circuit 10. Depending on the register control signal 108 for test input from the test circuit 10, register 5 fetches the data output already to the internal bus 8 from the interface circuit 6 and stores it. The data stored in the register 5 is input to the internal logic circuit 20 to execute a predetermined logical operation. The operation result data by the internal logic circuit 20 is stored again in the register 5.

When the data (the second signal) signifying the instruction to output the operation result data by the internal logic circuit 20 stored in the register 5 to the external terminal 7 from the interface circuit 6 through the internal bus 8 is input to the second external input terminals 11a, 11b, 11c and 11d of the test circuit 10, the test circuit 10 outputs the register control signal 108 for test and interface circuit control signal 109 for test according to the data input to the second external input terminals 11a, 11b, 11c and 11d.

Depending on the register control signal 108 for test input from the test circuit 10, register 5 outputs the data stored therein or the operation result data of the logic circuit 20 connected thereto to the internal bus 8. Depending on the interface circuit control signal 109 for test input from the test circuit 10, interface circuit 6 fetches the data output already to the internal bus 8 from the register 5 from the internal bus 8 and outputs it to the external terminal 7.

Thus, processes for inputting data from the external terminal 7 of the interface circuit 6 to set it in the register 5, storing the operation result of the internal logic circuit 20 with respect to this data again in the register 5, and transferring it to the interface circuit 6 to output it from the external terminal 7, are executed directly by the control of test circuit 10 without inputting the instruction code of the data transfer instruction to the input terminal 1. By checking the data output from the external terminal 7 it can be determined the logic circuits are operating normally and testing can be conducted promptly with relatively simple processings.

As particularly described hereinabove, according to the present invention, whether respective logic circuits included in the semiconductor circuit are operating normally can be tested promptly with relatively simple processings.

This invention may be embodied in several forms without departing from the spirit of essential characteristics thereof. The present embodiment is therefore illustrative and not restrictive and the scope of the invention is defined by the appended claims rather than by the description preceding them. All changes that fall within the meets and bounds of the claims, or equivalence of such meets and bounds thereof are therefore intended to be embraced by the claims.

What is claimed is:

1. A circuit for testing logic circuits in a semiconductor comprising:
    an interface circuit for inputting data to and outputting data from an external source;
    an interface control circuit connected to said interface circuit which outputs a control signal for controlling said interface circuit;
    an internal bus connected to said interface circuit;
    a register connected to said internal bus;
    a register control circuit connected to said register which outputs a control signal for controlling data input to and output from said register; and
    a logic circuit connected to said register which performs logic operations with respect to data stored in said register and stores a result of the logic operations in said register;
    a test circuit having first and second external input terminals connected to provide a first output signal which voids the control signal to said interface circuit from said interface control circuit and to said register from said register control circuit when a first signal is input on said first external input terminal, and to provide a second output signal to said interface circuit and said register when a second signal is input on said second external input terminal, said second control signal causing data from said interface circuit to be transferred to said register and stored therein and further causing data stored in said register to be output to the external source from said interface circuit.

2. A test circuit for logic circuits as set forth in claim 1, wherein said semiconductor circuit is a one-chip microcomputer.

* * * * *